Aug. 6, 1968  G. S. ALLIN, JR  3,395,783
SAFETY SYSTEM FOR MACHINE MAINTENANCE WORKERS
Filed Sept. 21, 1965
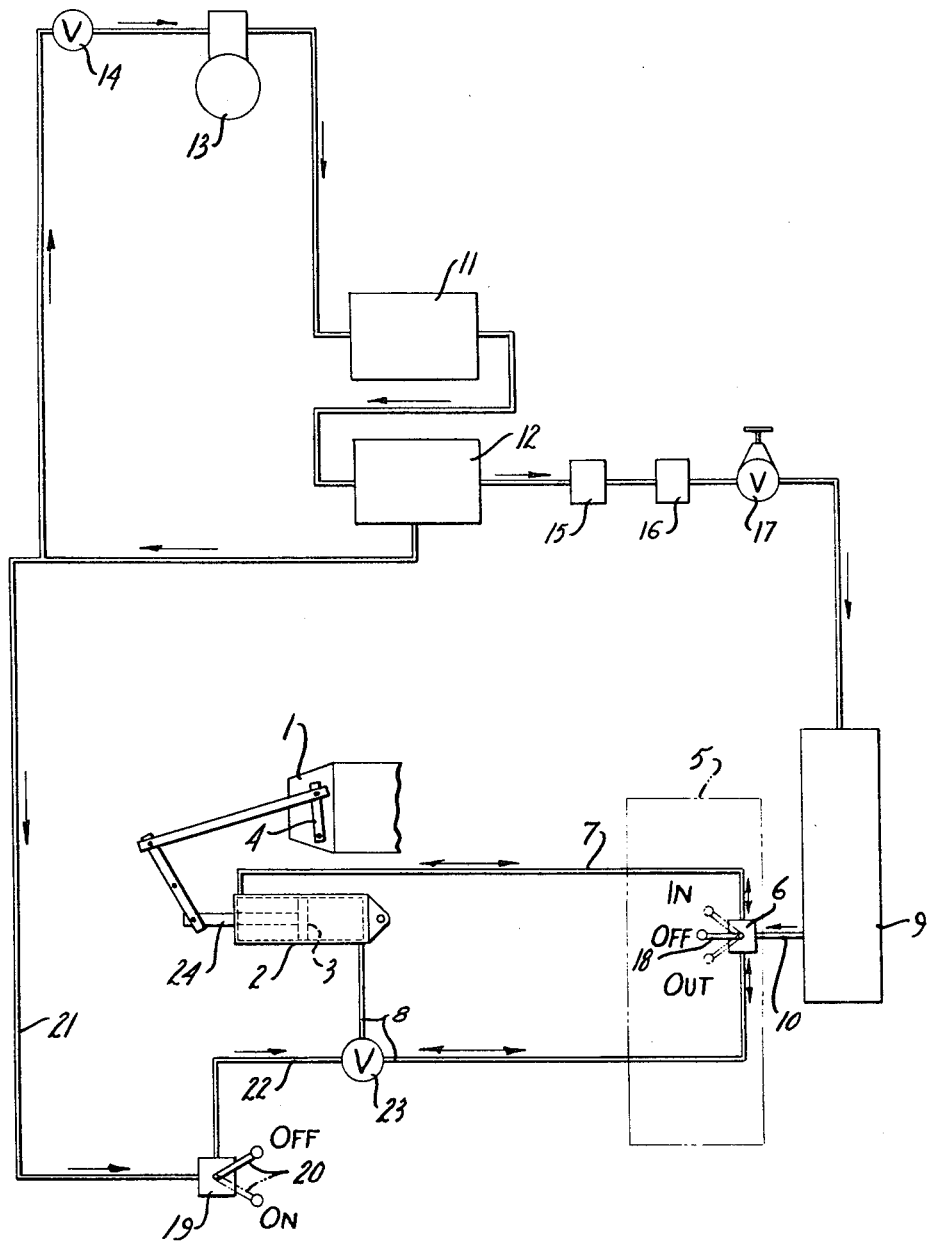
INVENTOR
GEORGE S. ALLIN JR.
BY
Andrus & Starke
Attorneys

United States Patent Office 3,395,783
Patented Aug. 6, 1968

3,395,783
SAFETY SYSTEM FOR MACHINE
MAINTENANCE WORKERS
George S. Allin, Jr., Green Bay, Wis., assignor to Northwest Engineering Corporation, Green Bay, Wis., a corporation of Wisconsin
Filed Sept. 21, 1965, Ser. No. 488,844
4 Claims. (Cl. 192—83)

ABSTRACT OF THE DISCLOSURE

An over-center drive clutch actuated by an air cylinder and piston controlled by a valve located in the cab of a machine is provided with a safety actuator imposing a higher air pressure on the side of the piston which holds the piston in a position of clutch disengagement. The safety actuator is a valve disposed generally remote from the cab and out of sight of the operator in the cab, and which connects and disconnects a high pressure source with the cylinder to thereby over-ride any attempt by the operator to engage the clutch, whereby a repair man working on the machine may be safe from a possibility that the machine will be started until he completes his work.

---

This invention relates to safety apparatus designed specifically for the protection of maintenance men working on machines such as power shovels and cranes in positions where the operator cannot see them.

The apparatus when actuated by the maintenance man prevents the operator from starting the machine and thereby possibly injuring the maintenance man.

The invention has been applied to machines employing a mechanical drive clutch which is actuated by a compressed air cylinder to positive on and off positions. It utilizes the fact that the compressed air source is normally of higher pressure than the regulated pressure employed in the clutch actuating cylinder.

In carrying out the invention on such machines a valve is provided at a position of ready access by the maintenance man and remote from the operator's cab, to apply to the cylinder the full pressure of the source in a direction to maintain the clutch in disengagement.

The accompanying drawing illustrates schematically a safety apparatus as presently applied to a power crane, and constituting the best mode contemplated for carrying out the invention.

In the drawing the single view is a schematic diagram of the compressed air circuit and various machine elements of the apparatus connected therein.

The power crane or other machine is actuated by a suitable clutch 1, which in the present instance is an over-center mechanical clutch which stays in either the closed or open position when moved to either position.

The clutch 1 is actuated to either position by a cylinder 2 with a double acting piston 3 therein and which is suitably connected to the clutch actuating lever 4.

The piston 3 is moved to either end of cylinder 2 by compressed air under the primary control of the operator in the cab 5 of the machine.

For this purpose the operator has a three position poppet type control valve 6 in the cab 5 and which is connected to one end of cylinder 2 by the tubular passage or line 7 and to the opposite end of the cylinder 2 by the tubular passage or line 8. The valve 6 is connected to a manifold 9 by a passage or line 10 to receive compressed air at a constant regulated pressure.

The source of compressed air is provided by the tanks 11 and 12 in which the air is maintained above the normal working pressure by a compressor 13 and usual unloader valve 14. The compressor 13 may be regulated to supply compressed air to tanks 11 and 12 when the air in the tanks drops to a predetermined minimum such as approximately 105 pounds per square inch, and to stop supplying air to the tanks when the air in the tanks rises to a predetermined maximum such as 120 pounds per square inch.

Compressed air from the tank 12 passes through a filter 15, then a lubricator 16, and then a regulator valve 17, which latter reduces the working pressure to a constant value, such as ninety pounds per square inch, which is below the pressure in tanks 11–12.

he air at the working pressure is supplied from the regulator valve 17 to the manifold 9 from which connections are made to various controls, including line 10 which connects manifold 9 with the operator's clutch control valve 6.

complished the lever 18 is permitted to return to "off" position. Movement of the lever 18 by the operator to the "clutch in" position feeds compressed air from manifold 9 through tube 7 to one end of cylinder 2. At the same time the opposite end of cylinder 2 is opened to discharge through tube 8 and valve 6. When the piston 3 has moved to complete the closing of the clutch the operator releases lever 18 and it returns to the central "off" position under the influence of a spring (not shown).

In the "off" position for lever 18 the valve 6 connects both ends of cylinder 2 to discharge to the atmosphere and the piston remains without any force of air pressure on it.

Movement of lever 18 to the "clutch out" position feeds compressed air from manifold 9 through tube 8 to the other end of cylinder 2 and moves the piston in a direction to release the clutch 1. After the release is accomplished the lever 18 is permitted to return to "off" position.

In carrying out the present invention it is desired to have a safety clutch release operable by the maintenance man remote from the cab and which will override any control by the operator.

For this purpose a safety valve 19 is provided near where the maintenance man will be working, usually remote and out of sight of the operator. By means of valve 19 the maintenance man can lock the piston 3 against movement in the direction of "clutch in" and thereby be assured that the machine cannot be operated while he is working on it. When he finishes his work he actuates lever 20 of valve 19 to off position which then releases the piston 3 for control by valve 6.

The safety valve 19 may be a two position, i.e. "on" and "off," poppet valve type and is connected by tubular passage or line 21 to the tank 12 and by tubular passage or line 22 to a shuttle valve 23 in line 8.

When lever 20 of valve 19 is in the "off" position it closes line 21 to retain the pressure in tanks 11–12, and it opens line 22 to the air. The shuttle valve 23 prevents air from line 8 from entering line 22 at this time.

When lever 20 of valve 19 is moved to the "on" position it lets the compressed air from tanks 11–12 flow through line 21, through valve 19, through line 22, through shuttle valve 23 and a part of line 8 to the end of cylinder 2 which will effect holding of piston 3 in a position corresponding to "clutch out." The force on piston 3 on the side supplied through safety valve 19 corresponds to the source pressure in tanks 11–12 which is substantially higher than the working pressure in manifold 9 determined by regulator valve 17. Consequently, even if the operator actuates lever 18 to the "clutch in" position for valve 6, the pressure available to move the piston 3 away from the "clutch out" position will be insufficient to close the clutch.

Furthermore, the piston rod 24 for piston 3 is on the side most favorable to provide an additional pressure differential on the piston in a direction holding it in the clutch out position.

The shuttle valve 23 is preferably a two-way check valve which, in addition to preventing the air pressure from safety valve 19 from entering line 8 toward valve 6 where it would be freely discharged, also prevents air pressure from valve 6 from entering line 22 when valve 19 is in the "off" position.

The system as described is effective to protect the maintenance man working on a machine at a point remote from and out of sight of the operator in the cab against possible starting of the machine by the operator and consequent injury to the maintenance man. When the maintenance man is finished with his work he only flips valve 19 to the "off" position and it releases the piston 3 for actuation by the operator through valve 6.

Various modes of carrying out the invention are contemplated as being within the scope of the following claims particularly pointing out and distinctly claiming the subject matter which is regarded as the invention.

I claim:

1. In a machine having an over-center type drive clutch controlled by an operator at a given control position, a source of fluid pressure, means connected to said source for supplying fluid at a fixed pressure lower than the pressure of said source for actuating said clutch, means under the control of the operator at said control position for actuating said clutch by selected flow of fluid at said fixed pressure, means remote from the control position of said operator for over-riding his control of said clutch and for locking the same open, said last means being connected to said source and utilizing the source pressure as against the operating pressure for said clutch.

2. In a machine having a mechanical drive clutch of the over-center type controlled by an operator at a given control position, a source of pneumatic pressure, means connected to said source for supplying pneumatic pressure at a fixed pressure lower than that of said source, means utilizing said fixed pneumatic pressure under the control of the operator at said control position for actuating said clutch to either "in" or "out" position, and means utilizing said source pneumatic pressure under the control of a person substantially remote from the operator to lock said clutch against actuation to a closed position by the operator.

3. In a machine having a mechanical drive clutch of the over-center-type, a pneumatic piston-cylinder means to actuate said clutch in either direction, a source of pneumatic pressure, means connected to said source for supplying a fixed pneumatic pressure, a control valve connected to said last named means and to said piston-cylinder means to selectively admit said fixed pneumatic pressure to either end of the cylinder, and a safety valve disposed at a position on the machine substantially remote from said control valve and adapted to connect said source to the end of said cylinder on the side of said piston that moves the latter toward the "clutch-out" position.

4. In a machine having a mechanical drive clutch of the over-center type, a pneumatic piston-cylinder means to actuate said clutch in either direction and having a piston rod connected to the clutch to effect disengagement thereof in response to the extension of the piston rod from the cylinder, a source of pneumatic pressure, means connected to said source for supplying a fixed operating pneumatic pressure, a control valve connected to said last named means and to said piston-cylinder means to selectively admit said fixed pneumatic pressure to either end of the cylinder, and a safety valve disposed at a position substantially remote from said control valve and adapted to connect said source to the end of the cylinder opposite said piston rod.

References Cited

UNITED STATES PATENTS

| | | | |
|---|---|---|---|
| 2,550,373 | 4/1951 | Ortloff et al. | 192—86 |
| 2,598,023 | 5/1952 | Stevens | 192—87.18 X |
| 2,656,732 | 10/1953 | Clough | 192—83 X |
| 2,702,615 | 2/1955 | Morse | 192—83 X |
| 3,292,750 | 12/1966 | Branson et al. | 192—83 X |

FOREIGN PATENTS

| | | |
|---|---|---|
| 240,458 | 8/1962 | Australia. |
| 452,784 | 11/1948 | Canada. |

BENJAMIN W. WYCHE III, *Primary Examiner.*

UNITED STATES PATENT OFFICE
CERTIFICATE OF CORRECTION

Patent No. 3,395,783                                        August 6, 1968

George S. Allin, Jr.

It is certified that error appears in the above identified patent and that said Letters Patent are hereby corrected as shown below:

Column 2, line 12, "he" should read -- The --; line 17, cancel "complished the lever 18 is permitted to return to" and insert -- The actuating lever 18 of valve 6 has a central --.

Signed and sealed this 6th day of January 1970.

(SEAL)
Attest:

Edward M. Fletcher, Jr.                            WILLIAM E. SCHUYLER, JR.
Attesting Officer                                          Commissioner of Patents